United States Patent [19]

Korchnak

[11] 4,233,278
[45] Nov. 11, 1980

[54] PROCESS FOR PURIFYING CRUDE PHOSPHORIC ACID

[75] Inventor: Joseph D. Korchnak, Lakeland, Fla.

[73] Assignee: Davy Powergas Inc., Lakeland, Fla.

[21] Appl. No.: 889,985

[22] Filed: Mar. 24, 1978

[51] Int. Cl.² .................................................. C01B 25/22
[52] U.S. Cl. ........................... 423/321 S; 423/321 R; 423/8
[58] Field of Search ............. 423/321 S, 321 R, 8-10

[56] References Cited

U.S. PATENT DOCUMENTS

| | | | |
|---|---|---|---|
| 1,838,431 | 12/1931 | Milligan | 423/321 S |
| 3,781,410 | 12/1973 | Von Semel | 423/321 R |
| 3,894,143 | 8/1975 | Von Semel et al. | 423/321 S |
| 4,018,869 | 4/1977 | Beltz et al. | 423/321 R |
| 4,087,512 | 5/1978 | Reese et al. | 423/321 R |

FOREIGN PATENT DOCUMENTS

| | | | |
|---|---|---|---|
| 50-40498 | 4/1975 | Japan | 423/321 S |
| 173727 | 12/1934 | Switzerland | 423/321 S |
| 1050961 | 12/1966 | United Kingdom | 423/321 S |

OTHER PUBLICATIONS

Cason, Basic Experimental Organic Chemistry, 1964, pp. 44-53.

*Primary Examiner*—O. R. Vertiz
*Assistant Examiner*—Thomas W. Roy
*Attorney, Agent, or Firm*—Bernard & Brown

[57] ABSTRACT

Aqueous phosphoric acid, e.g., a slurry of the acid produced by the "wet" process, is contacted with steam under organic volatile-removing conditions to remove volatile organic material. A "wet process" aspect of the process involves contacting crude phosphoric acid produced by the wet process at a temperature, preferably not greater than 100° C., while binding bindable solid impurities present and controlling the density of the acid to avoid deleteriously affecting the processing character of the acid. In a first facet of this aspect, humic-extracting extractants are employed to remove humics, and in a second facet, heavy metal-extracting extractants are employed to recover heavy metals, from the acid.

5 Claims, 3 Drawing Figures

PROCESS FOR PURIFYING CRUDE PHOSPHORIC ACID

This invention pertains to a process for removing volatile organic material from phosphoric acid with steam.

In the wet process for the manufacture of phosphoric acid, generally dry or wet ground phosphate rock is added to a reaction system containing a slurry of phosphoric acid and calcium sulfate crystals, and the phosphate rock is dissolved by part of the phosphoric acid. Sulfuric acid is also added to the reaction system and reacts with the dissolved phosphate to form phosphoric acid and calcium sulfate. The calcium sulfate crystallizes out and is separated from the phosphoric acid by filtration and washing. Under the conditions employed in most commercial operations, the calcium sulfate crystallizes a gypsum $[CaSO_4 \cdot 2(H_2O)]$, the crystals are water washed substantially free of phosphoric acid in a filtration system, and at least some of the washings are returned to the reaction system. This crude phosphoric acid will generally contain metal values and a considerable amount of undesirable, naturally occurring, organic material in addition to the gypsum.

The organic material may be present in phosphoric acid as a result of the acid being produced from organic-containing phosphate ore. They may be classified as volatile organics (e.g., those having a vapor pressure generally greater than 0.1 millimeter of mercury at atmospheric pressure) and nonvolatile organics, the latter being commonly referred to as "humics." Organic material may also be present as a result of the phosphoric acid having been treated with organic material, e.g., with liquid organic extractants used to extract material, residues of which remain in the phosphoric acid. For instance, volatile organic extractants may be used to remove humics or metal values (e.g. uranium) leaving residues of the extractant in the phosphoric acid.

Phosphate rock contains as a principal mineral apatite, most often fluorapatite, $Ca_{10}F_2(PO_4)_6$, as well as other minerals including one or more of silicates, including fluorosilicates, calcium carbonate, alumina, iron-containing, uranium-containing and other heavy metal-containing materials, which generally end up in the phosphoric acid mixture produced by the wet process. Especially in lower grades of phosphate rock where substantial amounts of heavy metals may be present, the removal of humics along with heavy metals from the phosphoric acid may be required to provide a suitable product acid. Moreover, the phosphoric acid may be an advantageous resource for these heavy metals. For instance, the phosphate rock mined in Florida may contain about 1 lb. of $U_3O_8$ per ton of $P_2O_5$ (0.05 wt. %). While the amount of uranium value may seem small, the quantities of rock processed are substantial such that hundreds of tons of uranium per year may be recoverable just from the Florida phosphate rock which is processed.

The extraction of humics or heavy metals is normally conducted by contacting the acid with a humic-extracting, or metal-extracting, water immiscible liquid organic extractant and separating the resulting immiscible organic phase from the acid phase. The extracted humics or metals are then removed from the organic phase. Frequently, however, a complete separation of the organic and acid phases is not feasible, and a three-part system generally results with distinct acid and organic phases, and an intermediate heterogeneous mixture or phase which may be in the form of an emulsion, e.g., a mixture of solids and liquids not readily separated by gravity. This intermediate portion may contain phosphoric acid, gypsum, extract (e.g., non-volatile organics, humics or metal values), and volatile organics (e.g., those usually present as well as organic extractant and solvents). In order for such an extraction system to be worthwhile, the desirable components in the mixture formed by the acid and organic phases should be capable of essentially complete and separate recovery. Moreover, in order for an extraction system to be economically feasible, it should not deleteriously affect the production of the phosphoric acid.

An object of this invention is to provide a process for the removal of volatile organic material from aqueous phosphoric acid, even at high concentrations of organic material, and even when the acid and organic phases form relatively stable mixtures, e.g., emulsions. Another object is the provision of such a process treating phosphoric acid which also contains non-volatile organic material wherein the separability of this material is enhanced and the processing character of the phosphoric acid liquid is not substantially deleteriously affected by the removal of the volatile organics. Another object is the provision of such a process for the processing of phosphoric acid produced by the wet process wherein humics or heavy metals are extracted, volatile organic material is removed, and the production and processing of the acid is efficiently conducted.

In accordance with the process of the present invention, volatile organics are removed from an aqueous phosphoric acid liquid, e.g., solution or slurry, generally by contacting the liquid with steam under volatile organic-removing conditions to remove steam removable, volatile organics from the liquid. These conditions include contacting the aqueous phosphoric acid liquid with steam at a temperature and pressure to produce a steam overhead. The steam overhead may also be generated, when sufficient water is present, by one or more of supplying heat or reducing the pressure of the phosphoric acid. Advantageously, the phosphoric acid need not be subjected to excessively high temperatures. For instance, the temperature of the phosphoric acid need not exceed about 100° or 120° C. and usually, about 50° to 90° C. is sufficient. The pressure employed is desirably about atmospheric pressure or below to provide an overhead containing steam, and is preferably sufficiently low to enhance vaporization of volatile organic material in the mixture. Thus, the absolute pressure, when sub-atmospheric pressures are employed, may often be less than about 700, preferably less than about 400, millimeters of mercury (mmHg) and may range as low as practicable, e.g., to an absolute pressure of about 10 mmHg or less. The absolute pressure is generally from about 25 to 500, preferably from about 50 to 400, mmHg.

Under the conditions at which the mixture is maintained, volatized organic material passes with the steam as overhead. The volatile organic-removing conditions are maintained for a period of time sufficient to remove volatilizable organic material from the mixture and will depend on the amount of organic material present, the rate of its removal, and the desired completeness of its removal. Generally, the phosphoric acid mixture containing volatile organic material, e.g., in the range of about 0.1 to 10 weight percent, is subjected to steam stripping for a period of time sufficient to remove at least about 75, preferably at least about 90 or 95, weight percent of the volatile organic material in the mixture. If desired, the overhead can be condensed to provide water and the water-immiscible organic material which may readily separate into distinct phases, enabling recovery of the organic material.

A "wet process" aspect of the process of this invention involves aqueous phosphoric acid containing volatile organics also mixed with water-immiscible non-volatile organics, forming a heterogeneous mixture, e.g., a slurry. This aspect is particularly suitable for the processing of a crude phosphoric acid mixture, described supra, produced from phosphate rock by the wet process. In this aspect, the mixture containing the essentially water-immiscible organic material, is advantageously contacted with steam under volatile organic-removing conditions of temperature and pressure to produce a steam overhead while maintaining a concentration of acid in the acid phase below that concentration which results in a substantial change of the processing character of the phosphoric acid mixture, e.g., to avoid or minimize the formation of a viscous mass of solids comprised of acid and organic material, e.g., an undesirable, messy, non-free flowing viscous mass which may appear as a "black glob," which is difficult to process. The temperature employed in the steam stripping, volatile organic-removing conditions, set forth above, in this aspect of the process is, under such conditions, advantageouly not greater than about 100° C. to remove the volatile organic materials and, preferably, to bind, e.g., by agglomeration or coagulation, any bindable non-volatile impurities present. In addition, the conditions in this aspect advantageously include controlling the density of the acid at a density, preferably a substantially constant density, to avoid or minimize the formation of a viscous mass. Generally, the concentration of the acid in the acid phase is maintained substantially constant during the steam stripping for the sake of economy since the evaporation of excessive amounts of water by the steam to concentrate the acid may be uneconomical from a commercial standpoint and dilution of the acid by condensing steam may require additional expenditures of energy in concentrating the acid to desired levels in further processing.

The density is controlled advantageously by maintaining the water content of the phosphoric acid above about 40 weight percent. In the control of the density of the phosphoric acid during stripping, the concentration of the acid in the acid phase does not exceed that concentration resulting in a density which deleteriously affects the subsequent processing of the phosphoric acid. The concentration may generally range up to about 55 to 60 weight percent (based on $P_2O_5$). Since the concentration of phosphoric acid produced by the wet process is often about 20 to 45 weight percent, the concentration of the acid under the volatile organic-removing conditions is conveniently maintained substantially constant in that range, preferably in the 25 to 40 weight percent range. When essentially saturated steam is passed through the mixture as a means for providing a steam-containing overhead, conditions may be such that little, if any, increase in the phosphoric acid concentration is obtained. When superheated steam is employed, however, significant amounts of water can be volatilized, and water can be added to maintain a desired water concentration, e.g., one of at least about 40 weight percent. Similarly, when the steam is generated from the existing water in the phosphoric acid, water can be added to maintain a desired concentration.

In order to enhance the separation of purified phosphoric acid from the non-volatile material, e.g., humics, silicates, silica, and gypsum, etc. which remain in the stripped mixture, various additives may be employed. Oxidizing agents, for instance, inorganic oxidizing agents such as $KMnO_4$, $K_2Cr_2O_7$, sodium chlorate, persulfate, ozone and peroxides, preferably hydrogen peroxide, may be added to the stripping section, batch-wise or continuously, to promote binding of the non-volatile matter. The oxidizing agent is employed in amounts to enhance the binding of nonvolatiles and, as a guide, hydrogen peroxide may be used in amount equivalent to one part by weight per part by weight per part of humics.

The volatile organic materials stripped from the phosphoric acid mixture exit with the overhead. Any remaining, substantially non-volatile organics form relatively nontacky solids and can be facilely removed from the acid phase by, for instance, physical separation means without undue deleterious effect to the means.

In a first facet of the "wet process" aspect of the invention, humic-extracting extractants may be employed to remove humics, advantageously before the acid mixture is contacted with steam under the volatile organic-removing conditions set forth above. In low grade phosphate rock, the humics may comprise up to about 1.5 or more weight percent of the rock, and 0.5 weight percent of the crude acid produced from the rock. A relatively volatile, substantially water-immiscible organic humic-removing extractant can be admixed with the crude acid in an amount sufficient to essentially dissolve the humics and provide an organic phase. A mixture of acid and organic phases may be produced in the form of an emulsion along with separate acid or organic layers. The amount of extractant added to the phosphoric acid may vary considerably, e.g., it may be employed in amounts of about 2 or less weight percent up to about 70 to 75 weight percent of the mixture. Generally the extractant is provided in an amount from about 2 to 60, preferably from about 5 to 50, weight percent of the mixture. The extractant used is advantageously one with a vapor pressure of at least about 1.0 millimeter of mercury at room temperature (i.e., about 25° C.). Suitable organic, humic-removing extractants include petroleum distillates such as kerosenes, naphthas and the like, and normally liquid, predominantly hydrocarbon-containing carbonaceous materials, e.g., having molecular weights up to about 200 or more such as hexane, decane, cyclohexane, benzene, toluene, and the like.

In a second facet of the "wet process" aspect of the process of the present invention, the recovery of heavy metal values, e.g., uranium values, can be effected by extracting one or more of them from aqueous crude phosphoric acid with a volatile, water immiscible, organic metal-removing liquid extractant. In this facet, the crude phosphoric acid is contacted with the extractant, in heavy metal extracting amounts, to extract the heavy metal values, e.g., uranium value, from the phosphoric acid.

The metal-recovering, organic extractant may complex, or chemically or physically combine, with the material sought to be extracted, and thus extracts the material from the acid phase into the organic phase. Suitable extractants are advantageously water-insoluble and include organic amines e.g., di- and tri-hydrocarbyl substituted amines having at least one hydrocarbyl group of 6 or more carbon atoms, wherein the hydrocarbyl groups may be saturated or unsaturated and have 1 to about 20 or more carbon atoms; di- and tri-hydrocarbyl ammonium slats; mono-and di-hydrocarbyl phosphoric acids wherein at least one hydrocarbyl group has 6 or more carbon atoms, and the hydrocarbyl groups may be saturated or unsaturated and have 1 to about 20 or more carbon atoms; and tri-hydrocarbyl phosphine oxides wherein the hydrocarbyl groups may have about 2 to 20 carbon atoms; and the like. The organic extractant may be contained in an essentially water-insoluble organic solvent such as hexane, benzene, toluene, kerosene, naphtha, and the like. Other extractants include hydrocarbons, e.g., one or more aliphatic or aromatic compounds having at least 6 carbon atoms and which are sufficiently volatile to permit steam stripping. The preferred extractant consists essentially of at least one material, having at least 6 carbon atoms, selected from aliphatic or aromatic hydrocarbons, di- and tri-amines, ammonium salts, mono- and di-hydrocarbyl phosphoric acids, and trihydrocarbyl phosphine oxides. One extractant comprises a combination of di (2-ethylhexyl) phosphoric acid and trioctyl phosphine oxide and another comprises a mixture of mono- and di-octylphenyl phosphoric acid.

The metal-recovering organic extractant, like the humic-removing extractant, is advantageously one with a vapor pressure of at least about 0.1 mmHg, preferably at least about 1 mmHg at room temperature, i.e., about 25° C. The metal-recovering organic extractant is used in an amount sufficient to extract metal values, e.g., in an amount sufficient, on a stoichiometric basis, to extract at least about 75 to 98 percent of the material to be extracted. The amount of organic extractant is preferably not employed in excessive amounts due to economic considerations and frequently is employed in an amount up to about 5 to 10 times that required on a stoichiometric basis for extracting the material to be extracted.

A given batch of crude phosphoric acid can be first subjected to the humic-removing extractant system of the first facet and then to the metal-recovering extractant system of the second facet, or vice versa, or to only one facet, or without being subjected to either facet, i.e., without being subjected to any extraction system in the "wet process" aspect of the process of the present invention. When employing either one or both of the first and second facets, the acid, along with the extractant can be advantageously conducted to a separation vessel which generally separates the mixture into three phases, consisting essentially of (a) a phosphoric acid phase which is generally removed for further processing, in the acid plant and which may include subjection to steam stripping before further processing in the acid plant if it contains significant amounts of volatile organics, (b) an extractant phase containing recovered humics or metal values which is generally removed for further processing, and (c) a rather viscous phase, usually at the interface of the other two phases, which is essentially a heterogeneous mixture of both the extractant and acid phases containing non-volatile organics (e.g., humics or metal values) and volatile organics (e.g., extractant). The heterogeneous mixture, from either a first facet or second facet extraction system, is advantageously then contacted with steam under the steam-stripping, volatile organic-removing conditions, set forth above, to provide an organic-containing vapor and steam-containing overhead.

Thus, the "wet process" aspect of the present invention includes steam stripping, under volatile organic-removing conditions, crude phosphoric acid, which may or may not have been subjected to a purification treatment, e.g., an extraction treatment of the type set forth in either or both of the first and second facets described supra, and also includes such steam stripping of phosphoric acid mixtures produced as a result of such extraction treatments. Within the parameters described for these conditions supra, steam is preferably passed through the crude acid or an acid and organic extractant-containing mixture in a continuous, semibatch or batch, stripping operation. Advantageously, the stripping operation may be countercurrent although co-current and cross-current stripping operations may also find application. The temperature of the mixture during stripping, as previously noted, is preferably below about 100° C. At the higher stripping temperatures, fluorosilicates and other somewhat volatile impurities may be volatilized and the resultant organic material recovered from the overhead may thus contain such contaminants. Generally, some contamination of the organic material (e.g., including extractant) from the overhead can be tolerated in commercial operations, and, if desired, the process of the invention can assist in the removal of fluorosilicates and other undesirable somewhat volatile components in the phosphoric acid. If contamination of the organic material in the overhead is undesired, the stripping operations can be conducted at temperatures of up to about 90° C. and little, if any, fluorosilicates may be present in the overhead.

The pressures employed during stripping are set forth above. Preferably, the pressure is sufficiently low to enhance the vaporization of the organic extractant such that no more than 100 ppm, preferably less than 50 ppm, of the organic extractant remains with the phosphoric acid before the acid is further processed in the acid plant otherwise the extractant in the acid will probably cause damage to the rubber lined equipment and evaporators in the acid plant.

The use of excessively large amounts of steam may be undesirable from an economics standpoint, as noted above; however, an amount sufficient to enhance the volatilization of the organic material is used. The steam is generally provided in an amount of about 1 to 10, preferably about 3 to 5, parts by weight per 1 part by weight of organic material in the stripper overhead. Conveniently, the steam may be low pressure steam, for instance, under about 50 pounds per square inch gauge, and the steam may be saturated or superheated, and preferably is at a temperature of less than about 150° C. Advantageously, the temperature of the steam and its degree of saturation are not such that excessive amounts of water are vaporized from the mixture.

The steam stripping removes volatile organic materials from the mixture and organic volatile-removing conditions are advantageously employed to provide a bottom stream having a low volatile organic content, e.g., less than about 1 weight percent, even less than about 100, say, less than about 20, ppm by weight volatile organic material. The visual appearance of the crude acid may improve upon treatment. For instance, a black crude acid may be improved in color to an amber color, or an amber-colored crude acid may improve to a greenish color, upon steam stripping in accordance with this invention. Importantly, the crude acid from the steam stripping can be subjected to solids separation procedures without undue difficulty. Any residual organic materials do not tend to foul filtering media employed to remove solids such as gypsum and silicates. Moreover, the residual organic materials tend to form agglomerates with the gypsum or silicates present in the crude phosphoric acid; these agglomerates may be removed by physical separation means such as filtration and centrifugation. While this aspect of the invention has been discussed with the steam-stripping procedure preceding solids separation, solids separation may be effected after an extraction procedure but prior to the steam stripping procedure.

The use of oxidizing agents has been set forth above and these agents can decrease or eliminate the use of organic extractants for enhancing phase separation. Under these conditions, the amount of steam is likely to be higher, e.g., in the case of humics, about 10 parts steam per part of humics is preferred. Also, when the addition of organic extractants is not involved, a longer residence time (e.g., 1 to 2 hours) may be advantageous in the stripping step and the use of a batch or semibatch operation would also be advantageous.

The phosphoric acid, in the "wet process" aspect of the present invention, can be essentially fully recovered from the material extraction systems which may be used. It may contain the material to be extracted since upon vaporization of the extractant, the material to be separated generally becomes dissociated from it. The phosphoric acid-containing bottoms may be recycled to the organic extraction stage to remove these materials which can be separated by extraction, or the bottoms can be discharged for further processing with the acid phase fraction from the organic extraction.

The overhead from the steam stripping contains volatile organics. Advantageously due to the conditions of the steam stripping, the overhead is relatively free from contaminants which may adversely affect the organic extractant. The overhead can be condensed and allowed to separate to form an organic extractant layer and an aqueous layer. The separation is generally relatively easily accomplished in that the overhead is substantially free from components which tend to form a mixed phase layer of the organic and aqueous phases. The recovered organic phase may be recycled for further use in the extraction system.

These and other aspects will be understood by reference to the specific embodiments of the process and with reference to the drawing.

Figure 1:
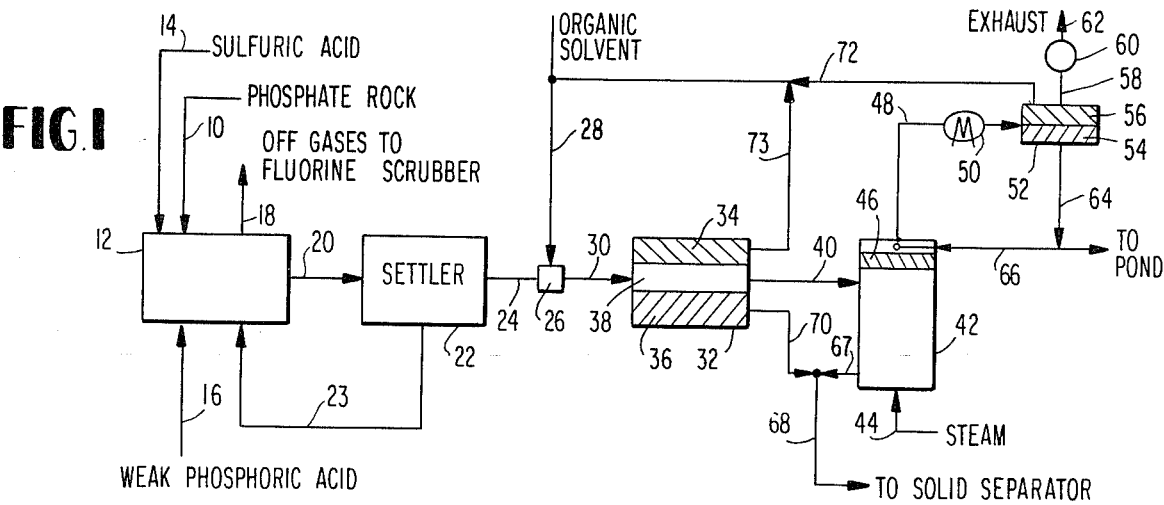
FIG. 1 is a schematic representation of a flow diagram of wet process phosphoric acid operation employing a humics removal procedure with an organic extractant in accordance with this invention.

With reference to FIG. 1, phosphate rock containing humics is passed via line 10 to digester 12 and sulfuric acid is supplied to digester 12 by line 14. Also fed to digester 12 via line 16 is weak phosphoric acid. The weak phosphoric acid may be obtained by, for instance, washing solids recovered from the produced crude phosphoric acid and using the wash water as the weak phosphoric acid. In the digester phosphoric acid is formed, and gypsum and silicate-containing compounds are crystallized. Since the phosphate rock contains fluorine, fluorine-containing gases such as HF are produced. The off-gases from the digester are passed through line 18 to a fluorine scrubber (not depicted).

The phosphoric acid-containing product, i.e., crude phosphoric acid, is passed via line 20 to settler 22 from which part of the crude phosphoric acid is withdrawn via conduit 24 and part is recycled via 23. The crude phosphoric acid in conduit 24 passes to mixing vessel 26 wherein it is admixed with extractant (organic solvent) from line 28. The resultant acid and solvent mixture is passed to phase separation tank 32 via line 30. In phase separation tank 32 the material separates into an upper organic phase 34, a lower acid phase 36, and an intermediate heterogeneous mixed phase 38 which is a mixture of the organic and acid phases. The intermediate mixture is drawn off through line 40 and passed to steam stripper 42. In steam stripper 42, the mixture is contacted with steam from line 44. The stripping operation can be conducted advantageously as a semibatch step to assure adequate residence time, which generally averages about 1.5 hours. Steam is introduced below the liquid level, e.g., about 1 meter, to promote agitation of the mixture and adequate contact. Steam evolves as overhead carrying with it volatilized organic material, passes through demister 46, exits via overhead line 48, is cooled and condensed in condenser 50, and the condensed liquids are passed to decanter 52. Separate aqueous phase 54 and organic phase 56 are formed in decanter 52. The decanter is in communication with vacuum pump 60 via line 58, and gaseous exhausts from the system can exit via line 62.

The aqueous phase in decanter 52 is drawn off via line 64 and is conducted to an off-site pond. A portion of the water can be recycled to stripper 42 via line 66 as make-up water to maintain a desired acid concentration in the stripper. The bottoms from the stripper are passed via line 67 to line 68 and then to a solids separator (not shown) to remove the crystalline calcium sulfate, residual organic material which may be agglomerated with the calcium sulfate, and other solids from the crude acid. Line 68 is in communication with line 70 which is adapted to transport the acid phase materials from phase separation tank 32 to line 68 and then to the solid separation unit (not shown).

The organic phase material 56 in decanter 52 is drawn off via line 72 for recycling in the process. Also passing to line 72 is the organic phase from phase 34 of separation tank 32 via line 73. The organic solvent is returned to line 28 for reuse in assisting to remove humics from the crude phosphoric acid.

Figure 2:
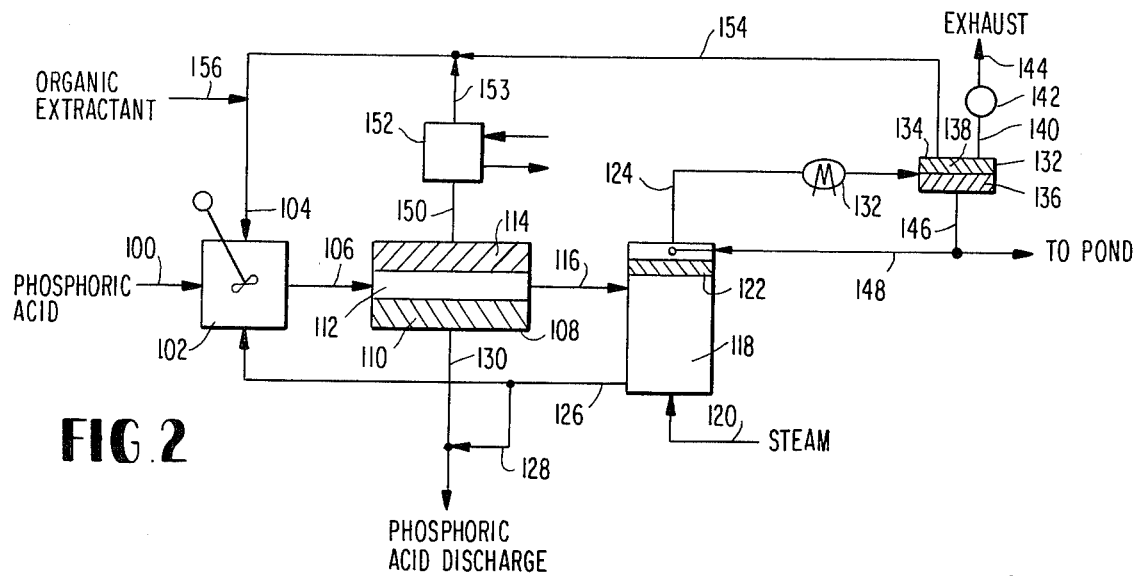
FIG. 2 is a schematic representation of a flow diagram of an operation for extracting heavy metal values from phosphoric acid which employs an organic extractant removal procedure in accordance with this invention.

With reference to FIG. 2, phosphoric acid which contains a material to be extracted, say, uranium-bearing compounds, is passed via line 100 to mixing and extraction vessel 102 where it is mixed with organic extractant for the material, e.g., a dialkyl phosphoric acid-containing extractant for removal of uranium-bearing compounds. The extractant is introduced from line 104, and uranium is extracted from the acid in an organic phase. The mixture formed in vessel 102 is passed to phase-settling tank 108 via line 106, and in tank 108, there is formed lower aqueous acid layer 110 having the uranium extracted therefrom, intermediate layer 112 comprising a heterogeneous mixture of the acid and organic extractant phases which mixture does not readily separate, and upper organic extractant layer 114 containing extracted uranium. The intermediate layer 112 is drawn off via line 116 and passed to steam stripper 118.

In steam stripper 118, steam from line 120 is passed through the mixed phase material and provides a steam-containing overhead. The steam carries with it the organic extractant in a vaporized form, and the overhead passes through demister 122 and exists stripping zone 118 via line 124. The stripper bottoms may regain the uranium from the vaporized organic extractant. Accordingly, the bottoms stream may be passed via line 126 to mixing and extraction vessel 102. If desired, a portion or all of the bottoms stream may be removed from line 126 via line 128 and passed to line 130, which is adapted to remove acid layer 110 from tank 108, for discharge from the extraction system.

The overhead from the stripper is cooled and condensed in condenser 132 and passes via line 124 to decanter 134. In decanter 134 are formed separate lower aqueous phase layer 136 and upper organic extractant layer 138. Decanter 134 is in communication with vacuum pump 142 via line 140, and line 144 is provided for the exhaust off gases. The aqueous phase in decanter 134 is drawn off via line 146 for discharge to, for instance, an off-site pond. A portion of the aqueous phase in line 146 can be passed via line 148 to stripper 118 to provide a desired acid concentration in the stripper.

The uranium-bearing organic extractant layer 114 in tank 108 is drawn off via line 150 and passed to uranium recovery unit 152. The recovered organic extractant is recycled via line 153 to line 104 and then to mixing and extraction vessel 102. The organic extractant phase in decanter 134 is passed via line 154 to line 104. Additional organic extractant, if needed, is provided to line 104 via line 156.

The invention will be further described by reference to the following examples which are in illustration and not in limitation of the invention. All parts and percentages are by weight unless otherwise noted.

EXAMPLE 1

A mixture of 60 parts by weight of crude phosphoric acid containing 30 weight percent acid (calculated as $P_2O_5$) and about 1.5 weight percent humics having an average molecular weight of about 400, and 40 parts by weight light naphtha type organic are passed to a steam stripping unit. The mixture is substantially in the form of a black emulsion. Approximately 3.5 pounds of steam per pound of organic material are passed countercurrently through the steam stripper over a period of about 1.5 hours. The mixture is maintained at a temperature of about 60° C. and pressure of about 170 millimeters of mercury absolute for the duration of the stripping operation and the acid concentration is maintained approximately constant. The overhead is condensed, a phase separation ensures, and the organic phase is decanted off. The bottoms from the steam stripper are analyzed to contain less than 25 ppm by weight of organics having a molecular weight of less than about 155. The residual, low volatility organics in the bottom are agglomerated with calcium sulfate crystals and can be removed by filtration or centrifugation.

Figure 3:
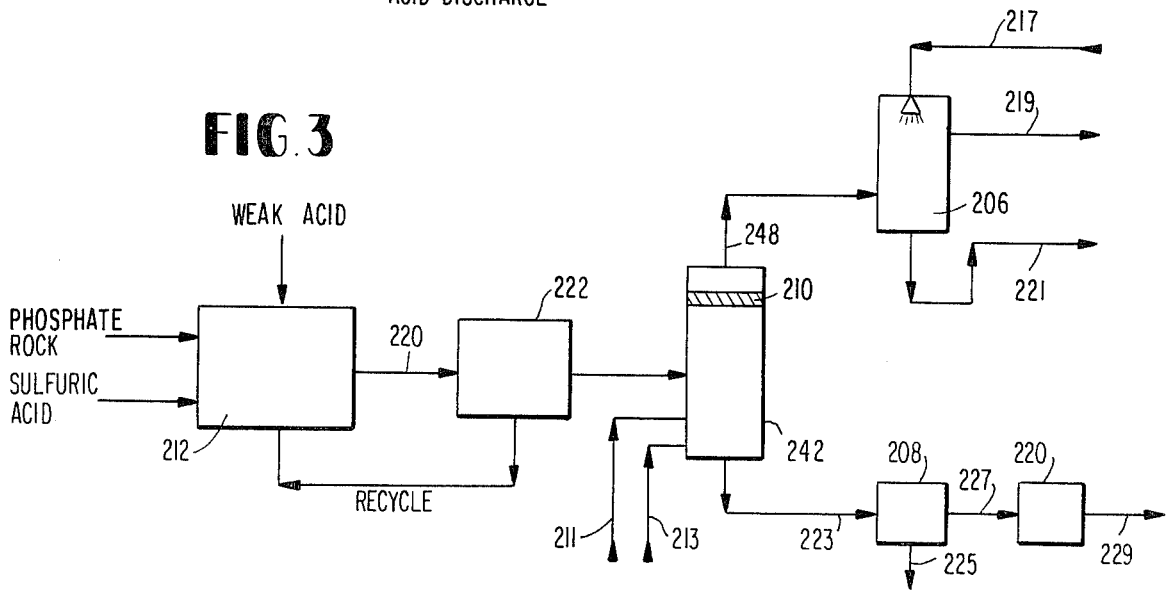
FIG. 3 is an alternate schematic representation of a flow diagram of removal of volatiles from wet phosphoric acid which has not been subjected to an organic extractant.

The enhanced phase separation obtained by steam stripping can be employed for purifying phosphoric acid with or without the extraction step. For instance, certain volatile organics present in the humics can be removed without addition of extractants. This procedure is shown in the following example, wherein the system shown in FIG. 3 is employed.

EXAMPLE 2

Phosphoric acid produced by reaction of humics-containing phosphate rock and sulphuric acid in the presence of weak phosphoric acid is conducted from tank 212 via line 220 to settler 222 from which crude phosphoric acid (30% $P_2O_5$) containing about 1% to 4% by wt. of humics in addition to being supersaturated with gypsum is fed to the steam treater unit 242. In steam treater 242, the humics-containing crude phosphoric acid is countercurrently contacted with approximately 10 lbs. of steam per lb. of humics during a residence period which can be about ½ to 2 hours, generally at a temperature of about 60 to 80° C. The density of the phosphoric acid can be controlled within a specific gravity range of about 1.3 to 1.4 via an externally applied vacuum system (not shown). To further enhance agglomeration and to further reduce the consumption of activated carbon, an oxidation additive, e.g., inorganic compounds such as hydrogen peroxide, ozone, etc. can be advantageously added to the stripper via line 213.

The overhead vapor containing steam with small quantities of volatized organic and inorganic material is passed through demister 210 and exits via overhead line 248. The overhead vapor is condensed in a barometric type condenser 206. Pond water for cooling is supplied through line 217. The noncondensable vapors exit via line 219 to the vacuum unit (not shown). The overhead condensables are sent to the gypsum pond via line 221. The bottoms from the stripper contain the initial 30% crude phosphoric acid, along with agglomerated calcium sulfate and non-volatile organic material that is partially oxidized and which can readily be separated. The bottoms pass via line 223 to separator 208, which is a flocculation-clarification, gravity separator, or filtrate system. The effluent 30% crude phosphoric acid exits via line 227 and the residual organic and calcium sulfate exit via line 225. Exiting the separator unit 208, the "black" incoming crude phosphoric acid is converted to a light amber color. The "light amber" 30% crude phosphoric acid can then be passed through a carbon bed 220 to further remove organic impurities. Exiting the carbon bed 220 via line 229 the acid obtained is a light green color and is acceptable for further processing such as heavy metal extraction or further concentration.

It is claimed:

1. In a wet process for the production of phosphoric acid of improved purity whereby a phosphoric acid slurry containing both volatizable organic material and non-volatile extractable ingredients from phosphate rock is contacted with a liquid organic extractant which extracts said extractable ingredients, thereby providing an extraction phase, an aqueous acid phase and a phase consisting essentially of a heterogenous mixture of both extraction and acid phases, said heterogenous mixture phase containing both volatizable organic material and bindable non-volatile ingredients; the improvement which comprises:

separating the heterogenous mixture phase from the extraction and acid phases, and treating the separated heterogenous mixture phase under steam-stripping, volatile organic-removing conditions including atmospheric or subatmospheric pressures to steam-strip the mixture so as to provide an overhead containing steam and steam-stripped, volatized organic material, thereby removing volatile organic material from the mixture, and to also thereby bind said bindable non-volatile ingredients to enhance their separation from the heterogenous mixture phase by liquid-solid separation procedures.

2. The process of claim 1 wherein as volatile organic removing conditions temperatures up to about 120° C. are employed.

3. The process of claim 1 wherein the concentration of the acid in the mixture subjected to steam stripping is up to about 60 weight percent and during the steam stripping is maintained at a substantially constant concentration.

4. The process of claim 2 wherein steam is introduced into said heterogenous mixture.

5. The process of claim 4 wherein the temperatures up to about 100° C. are employed and the pressure is from about 25 to 500 millimeters of mercury absolute.

* * * * *